US006590183B1

(12) United States Patent
Yeo

(10) Patent No.: US 6,590,183 B1
(45) Date of Patent: Jul. 8, 2003

(54) MARKING OF AN ANODIZED LAYER OF AN ALUMINUM OBJECT

(75) Inventor: Keng Kit Yeo, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 56 days.

(21) Appl. No.: 09/869,675

(22) PCT Filed: Nov. 6, 2000

(86) PCT No.: PCT/EP00/10957

§ 371 (c)(1), (2), (4) Date: Jul. 2, 2001

(87) PCT Pub. No.: WO01/34408

PCT Pub. Date: May 17, 2001

(30) Foreign Application Priority Data

Nov. 11, 1999 (SG) ........................................... 99/00123

(51) Int. Cl.[7] ............................................... B23K 26/38
(52) U.S. Cl. ................................................. 219/121.69
(58) Field of Search ....................... 219/121.69, 121.68, 219/121.67, 121.65, 121.66, 121.76; 220/269, 909

(56) References Cited

U.S. PATENT DOCUMENTS 4,547,649 A * 10/1985 Butt et al. ............. 219/121.66
6,105,806 A * 8/2000 Stasiuk ....................... 220/269
6,331,691 B1 * 12/2001 DePrisco et al. ...... 219/121.68
6,451,421 B1 * 9/2002 Robertson et al. ....... 428/315.5

FOREIGN PATENT DOCUMENTS

| | | |
|---|---|---|
| DE | 19509497 C | 7/1996 |
| EP | 0121150 A1 | 10/1984 |
| FR | 2649628 | 1/1991 |

* cited by examiner

*Primary Examiner*—Tom Dunn
*Assistant Examiner*—Jonathan Johnson
(74) *Attorney, Agent, or Firm*—Ernestine C. Bartlett

(57) ABSTRACT

A marking (3 to 5) is provided in a surface (8) of an element (1) which comprises a substrate (6) of aluminum or an alloy thereof and an anodized outer layer (7) in that a region (10) of the surface (8) is irradiated with a laser beam such that at least one visual property of the surface (8) in said region (10) is changed and a visual marking (3 to 5) is obtained which is observable to the human eye. The laser beam penetrates the anodized outer layer (7) at least to a major degree and induces the change in the at least one visual property substantially locally only in a zone (9) where the anodized outer layer (7) adjoins the substrate (6).

9 Claims, 2 Drawing Sheets

MARKING OF AN ANODIZED LAYER OF AN ALUMINUM OBJECT

TECHNICAL FIELD

The invention relates to a method of applying a marking in a surface of an element comprising a substrate of aluminum or an alloy thereof with an anodized outer layer as defined in the preamble of claim 1. The invention further relates to an element with an anodized surface as defined in the preamble of claim 9.

BACKGROUND AND SUMMARY

Protective layers of aluminum products obtained through anodizing in general have a high degree of hardness, a high resistance to wear, a good adhesion to the substrate, and a good heat resistance. This renders anodized surfaces highly suitable, for example, for use as protective layers on surfaces of practical objects which come into intensive contact with other surfaces such as electric irons, shavers, door knobs, pushbuttons, and the like. A problem here is that it is desirable in many cases to provide the surface with markings such as alphanumerical characters, logos, operating instructions, or decorative lines, patterns, or other structures. It is important in that case that the markings in at least a number of the above respects do not have substantially worse properties than the anodized layer, because the marking could then be damaged at an early stage by loads occurring during use against which the anodized surface is sufficiently resistant. For this reason, conventional techniques for providing markings, such as painting, silk-screen printing, and the provision of stickers, are unattractive in many cases. Many methods of marking anodized surfaces have accordingly been proposed which are more satisfactory as regards at least a number of the properties mentioned above.

A method of applying markings in an anodized aluminum layer is known from Japanese patent application with publication no. 07204871. The aluminum layer is first colored black in that a black pigment is introduced into the pores of the layer. Then the colored anodized layer is irradiated with a laser. The anodized layer is removed thereby where it is irradiated, so that a marking is obtained which contrasts in white against the background of the remaining anodized layer with black color. A disadvantage of this method is that the anodized layer is absent at the area of the markings, so that the aluminum is not protected there. This may lead, for example, to corrosion in the marking area, whereby the material properties as well as the sharpness of the marking are impaired.

Japanese patent application with publication no. 6-256993 describes a method in which this problem is counteracted in that the object is anodized once more. This, however, brings with it the disadvantage that an additional anodizing step is necessary.

French utility model 2 649 628 discloses an aluminum article which is first provided with an anodized layer, over which subsequently a layer is provided which is not resistant to laser radiation, whereupon markings are provided in the anodized layer through irradiation with a laser. This, however, has the disadvantage that the anodized layer is to be provided with an additional layer. This involves additional costs. Moreover, such a layer will usually not have as great a damage resistance, hardness, wear resistance, and heat resistance as an anodized layer.

A method and an element of the kind mentioned in the opening paragraph are known from German patent 195 09 497. This describes an anodized sole of an electric iron which is provided with markings in that the anodized layer is removed almost entirely along at least one line by means of a laser, such that a conversion layer comprising an aluminum oxide, aluminum, or an aluminum alloy with nitrogen included therein is formed by the anodized layer remaining behind in the processed surface. The conversion layer forms a protective layer against corrosion. Although the remaining conversion layer forms a protective layer and prevents portions of the anodized layer which adjoin the marking formed from breaking away, this method of marking of the anodized layer has the disadvantage that the markings form depressions of substantially the thickness of the anodized layer 25–70 ($\mu$m), which is disadvantageous for the application of the layer as a sliding layer of, for example, an electric iron.

It is known from European patent application 0 121 150 to provide an anodized layer with markings by means of a laser beam in that substances are added to the anodized layer, such as glucose hydrate, cobalt acetate, zinc acetate, zinc nitrate, lead carbonate, chromium carbonate, ammonium vanadate, nickel nitrate, or nickel acetate, which undergo a contrasting discoloration when acted upon by a laser beam with a high energy density. A disadvantage of this method is that a special treatment is necessary for adding the substance with contrasting discoloration under the influence of laser radiation, and that the necessity of providing the substance with contrasting discoloration under the influence of laser radiation prevents the coloring of the anodized layer.

It is an object of the invention to provide a solution which renders it possible to obtain an anodized surface provided with a marking, whereby a smaller transition is present in the region where the marking adjoins neighboring portions of the anodized layer, whereby the application of special substances which change color under the influence of laser radiation is not necessary, and which can be readily combined with conventional methods of coloring anodized layers.

According to the invention, this object is achieved by a method of providing a marking in an anodized layer which is carried out as claimed in claim 1. The invention may furthermore be embodied in an element as claimed in claim 9.

Since the laser beam penetrates the anodized outer layer at least for the major part and induces the change in the at least one visual property mainly locally in a zone of the region in which the anodized outer layer adjoins the substrate, zones of the anodized layer situated farther outward remain entirely or substantially unchanged, while the marking provided remains visible through the entirely or substantially unchanged anodized layer. The protecting effect of the anodized layer is not or substantially not detracted from thereby, and the layer remains substantially as free from unevennesses at its outer side as before the marking was applied. Furthermore, it is not necessary to introduce foreign substances into the anodized layer for providing the marking, so that the treatment required for this is dispensed with and no treatments are necessary which conflict with any coloring treatments.

Special embodiments of the invention have been defined in the dependent claims.

BRIEF DESCRIPTION OF THE DRAWING FIGURES

Further objects, aspects, effects, and details of the invention will now be explained in more detail below with reference to an embodiment shown in the drawing.

DETAILED DESCRIPTION

Figure 1:
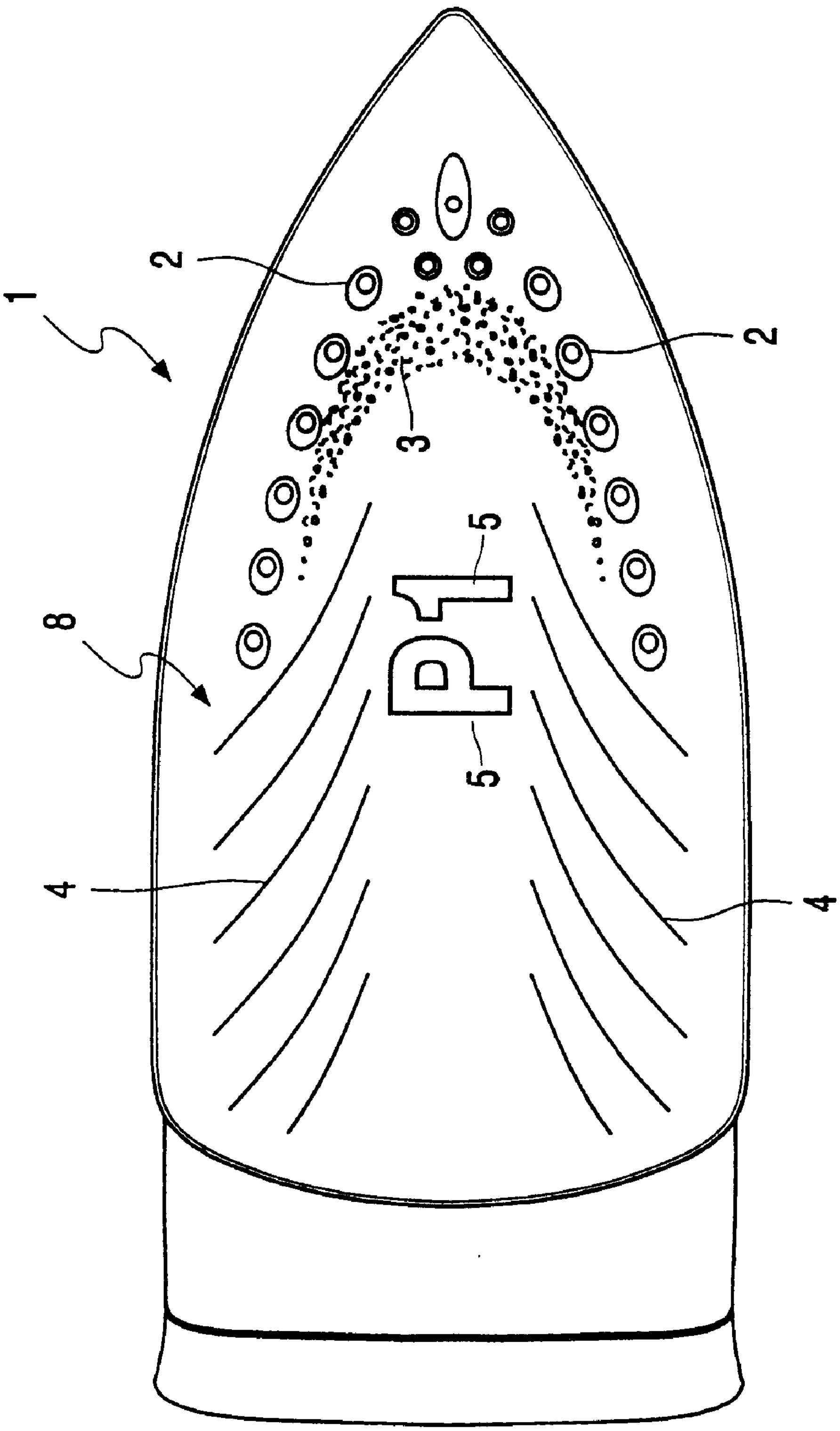
FIG. 1 is a bottom view of a sole of an electric iron.

The element shown in the drawing by way of example is a sole 1 of a steam iron which is provided with outlet openings 2 for the passage of steam and with markings in the form of a region 3 with a dotted structure, lines 4, and alphanumerical characters 5 which may form, for example, a type indication.

Figure 2:
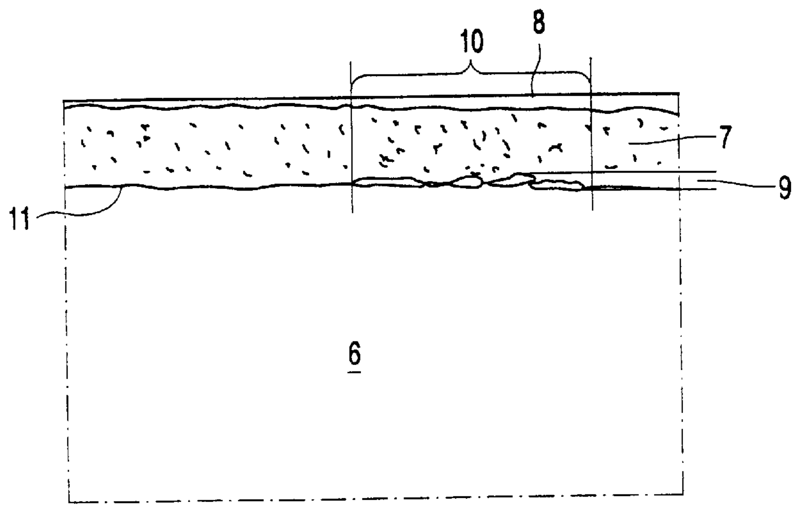
FIGS. 2 to 4 are cross-sectional views of an element provided with a marking, magnified to varying degrees.
Figure 3:
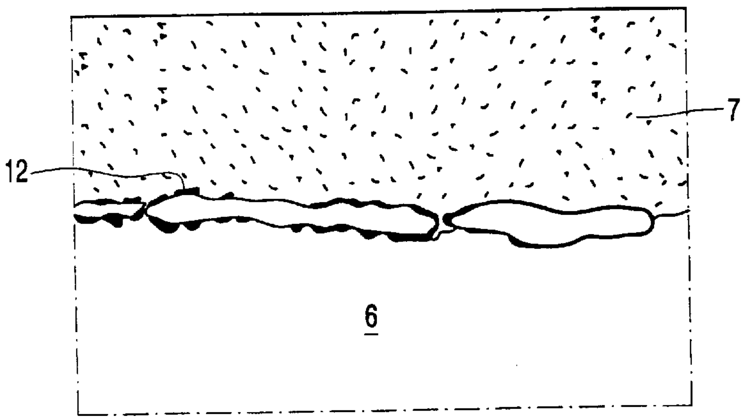
Figure 4:
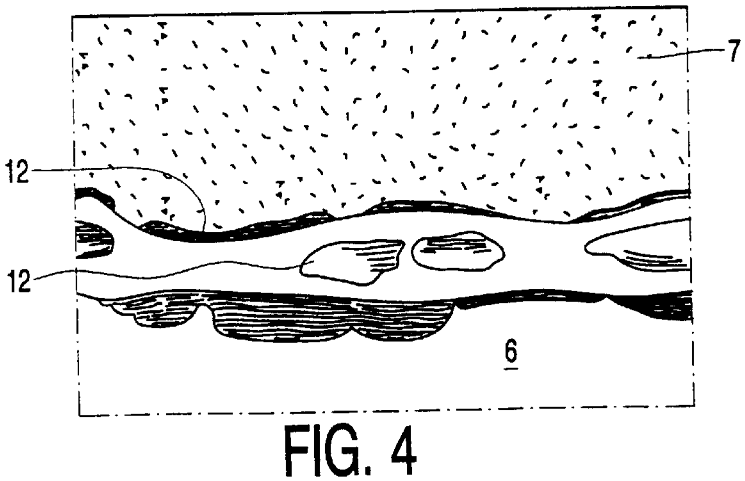

The sole 1 is built up from inter alia a substantially plate-shaped substrate 6 made of an aluminum alloy with an anodized outer layer 7 which forms the ironing surface 8 of the sole 1. This is shown in the cross-sectional views in FIGS. 2 to 4 which are based on microscopic pictures with magnification factors of 625×, 2500×, and 10,000×, respectively.

The regions of the surface 8 forming the markings 3 to 5 can be visually distinguished by the human eye from other portions of the surface 8 because they have a visual property which differs from the corresponding visual property of adjoining and other portions of the surface 8. The different visual properties of the regions of the surface 8 forming the marking 3 to 5 in this example are the hue and shine of these regions. These regions are a dark grey to black in hue and have somewhat less shine than other portions of the surface of the sole 1 in this example. If the surface 8 of the sole 1 is colored, for example electrolytically, the regions of the markings 3 to 5 will also have a color which deviates from the color of the other portions of the surface 8 of the sole 1. Depending on, for example, the version of the surface 8 and the degree to which the markings 3 to 8 contrast against the rest of the surface 8, it is possible that, for example, the shine of the regions forming the markings 3 to 5 does not differ from the shine of the rest of the surface 8.

The element exhibits these different visual properties locally only in a zone 9 in which the anodized outer layer 7 adjoins the substrate 6. As can be seen in particular in FIG. 2, the outer surface 8 in the region 10 and at the area of the transition from the region 10 to adjoining portions of the surface 8 does not show significantly more unevennesses than do other portions of the surface 8. This offers the advantage that the markings 3 to 5 do not adversely affect the sliding properties of the sole 1 and that the markings 3 to 5 do not provide any opportunity for dirt to accumulate.

The thickness of the anodized layer 7 in the region 10, moreover, is substantially equal to the thickness of the anodized layer outside the region 10, so that the protective action of the anodized layer 7 at the area of the markings 3 to 5 is substantially equal to the protective action of said layer outside the markings.

The changed visual properties of the regions 10 of the markings in the present example can be explained from at least one of the following effects:

the boundary layer 11 between the anodized layer 7 and the substrate 6 has a greater roughness in the area 10 of the markings 3 to 5 than in adjoining portions of the surface 8, the zone 9 has cavities 12 (see FIGS. 3 and 4), or at least more cavities than a corresponding zone of adjoining portions of the surface 8, and material in the zone 9 has a different structure, such as a different crystal structure than material in a corresponding zone of adjoining portions of the surface 8.

The provision of the markings in the surface 8 of the element 1 takes place in that the regions 10 designed for forming the markings 3 to 5 are irradiated with a laser beam such that at least one visual property of the surface 8 in the irradiated region 10 changes, and a visual marking 3 to 5 observable to the human eye is obtained. The laser beam here penetrates the anodized outer layer 7 at least to a major degree and induces said changes in the visual properties substantially exclusively locally in the zone 9 where the anodized outer layer 7 adjoins the substrate 6.

To achieve that the laser beam passes through the anodized layer without being absorbed to such an extent that this causes changes in the layer 7, the wavelength of the laser beam preferably lies in a range from 700 to 1400 nm. Particularly favorable results are obtained when the laser beam has a wavelength of between 1000 and 1100 nm, in particular of 1064 nm.

It is furthermore favorable when the laser is a pulsating laser and the pulse duration is less than 30 ns, preferably less than 20 ns, for realizing the envisaged changes exclusively in the zone 9 in which the outer layer 7 adjoins the substrate 6, and in particular for preventing any attacks on the anodized layer 7 outside the zone 9.

The treatment with a laser beam causes material in the zone 9 to melt locally and solidify again, whereby a change in roughness of a boundary layer 11 between the outer layer 7 and the substrate 6 is effected. Furthermore, cavities 12 are formed thereby in the zone 9, and material in the zone 9 transforms itself at least partly into a different structure through local heating.

What is claimed is:

1. A method of providing a marking in a surface of an element which comprises a substrate of aluminum or an alloy thereof and having an anodized outer layer, which method comprises: irradiating a region of said surface with a laser beam such that said laser beam penetrates said anodized outer layer at least to a major degree and induces a change in at least one visual property of said surface substantially exclusively locally in a zone in which said anodized outer layer adjoins said substrate in said region, whereby a visual marking observable to the human eye is obtained and zones of the anodized layer situated farther outward remain substantially unchanged, while the visual marking provided remains visible through the substantially unchanged anodized layer.

2. A method of providing a marking in a surface of an element which comprises a substrate of aluminum or an alloy thereof and having an anodized outer layer, which method comprises: irradiating a region of said surface with a laser beam such that said laser beam penetrates said anodized outer layer at least to a major degree and induces a change in at least one visual property of said surface substantially exclusively locally in a zone in which said anodized outer layer adjoins said substrate in said region, whereby a visual marking observable to the human eye is obtained and zones of the anodized layer situated farther outward remain substantially unchanged, while the visual marking provided remains visible through the substantially unchanged anodized layer, wherein said laser beam has a wavelength in a range from 700 to 1400 nm.

3. A method as claimed in claim 2, wherein said laser beam has a wavelength in a range from 1000 to 1100 nm.

4. A method as claimed in claim 1, wherein said laser beam is a pulsating laser beam.

5. A method as claimed in claim 4, wherein said laser beam has a pulse duration of less than 30 ns.

6. A method as claimed in claim 1, wherein material in said local zone is made to melt and to solidify again, whereby a change in the roughness of a boundary between said outer layer and said substrate is brought about.

7. A method as claimed in claim 1, wherein cavities are formed in said zone.

8. A method as claimed in claim 1, wherein material is locally heated in said zone and at least partly assumes a different structure.

9. A method as claimed in claim 5, wherein said laser beam has a pulse duration of less than 20 ns.

* * * * *